July 10, 1928.
R. POHL
1,677,004
MAGNETIC SHIELD FOR DYNAMO ELECTRIC MACHINES
Filed Feb. 17, 1927
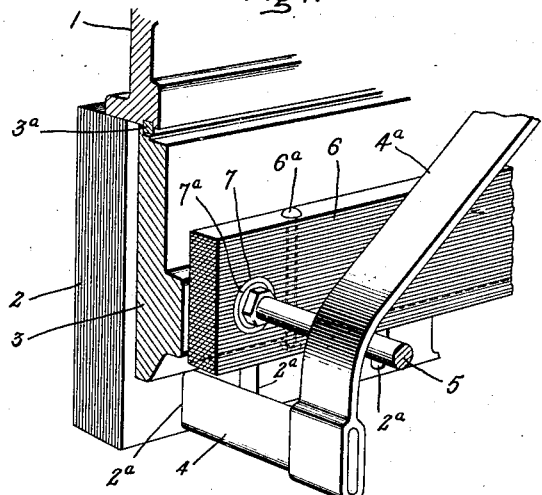
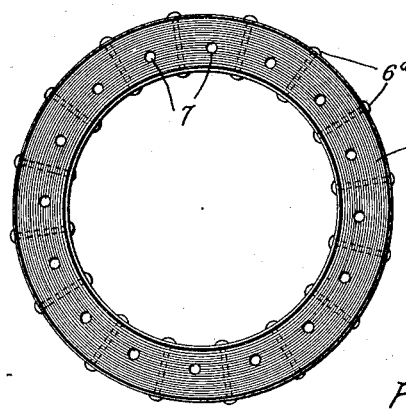
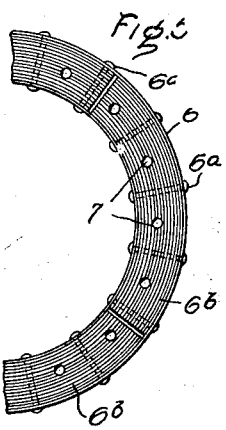
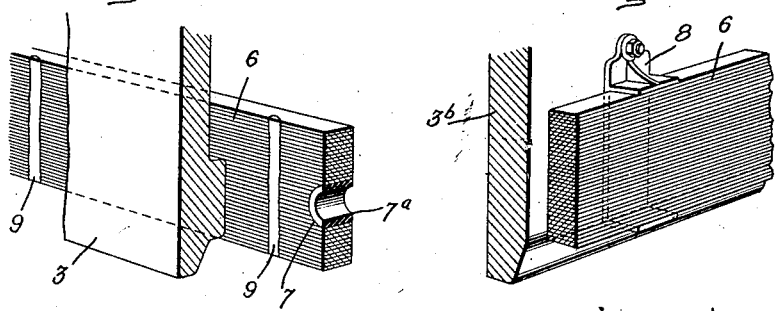
Inventor
Robert Pohl
by *[signature]*
His Attorney Patented July 10, 1928.

1,677,004

UNITED STATES PATENT OFFICE.

ROBERT POHL, OF BERLIN, GERMANY, ASSIGNOR TO GENERAL ELECTRIC COMPANY, A CORPORATION OF NEW YORK.

MAGNETIC SHIELD FOR DYNAMO-ELECTRIC MACHINES.

Application filed February 17, 1927, Serial No. 169,048, and in Germany March 25, 1926.

My invention relates generally to dynamo-electric machines and has for its object the provision of a construction whereby losses due to eddy currents set up in the conducting material of the structure of the machine will be reduced.

The end stray field of a polyphase alternating current machine, particularly one employing symmetrical windings, rotates synchronously with the stator rotary field with practically uniform speed and strength, and diminishes in strength toward the outer periphery of the stator winding. The passage of this rotating stray field through the massive constructional parts of the machine, such as the lamination clamping covers or end plates, causes large eddy current losses therein. In order to reduce the losses in these parts, in accordance with my invention, this end stray field is diverted into a good magnetic path peripherally of the stator which is laminated to prevent excessive eddy currents being induced therein.

For a consideration of what I believe to be new and my invention, reference should be had to the following description taken in connection with the accompanying drawing, in which Fig. 1 is a perspective view of part of an annular stator of a dynamo-electric machine showing my invention applied thereto; Fig. 2 is an elevation of a laminated annulus which I employ in connection with the structure shown in Fig. 1; Fig. 3 is a perspective view of a modified construction of the annulus showing the laminations supported by a welded joint; Fig. 4 is a perspective view of a clamp which I may employ to support the laminations in their relation to the machine in which they are used, and Fig. 5 is a modification of the annulus shown in Fig. 2 made in sections to increase the magnetic reluctance therethrough.

The structure as illustrated in Fig. 1 of the drawing shows part of a transverse section of the machine, the stator frame portion 1 and clamping member 3 cooperating with similar parts for clamping the laminations 2 and supporting them in the machine.

Referring to the drawing, a portion of the stator frame of a dynamo-electric machine is shown at 1 engaging the usual laminations 2, retained in position relative to the frame by a clamping member 3, which may be secured thereto in any suitable manner, for example by means of a key $3^a$. The laminations 2 are provided with slots $2^a$ for receiving insulated conductors 4 included in the circuit of the machine, it being understood that the conductor 4 is extended as shown at $4^a$ to another portion which passes through another similar slot in the laminations, one being shown for convenience in illustrating the invention. The conductors 4 and their end connections $4^a$ are supported in position by means of pins 5 which are secured to the clamping member 3, and are insulated from the laminations 2, clamping member 3, and pin 5, in any convenient manner.

In the construction shown in Fig. 1, if a varying flux enters the sides of the clamping member 3, comparatively large eddy currents will be induced therein, and in order to prevent this, I support a shield in the form of an annulus 6 of laminated magnetic material, closely adjacent the lateral face of the clamping member 3 and the extending portion of the conductors 4, with the edges of the laminations presented away from the lateral face thereof, so that flux entering the edges of the annulus and passing therearound will thread metallic sections of small transverse sectional area throughout its path.

The laminations of annulus 6 are varnished and secured together by pins $6^a$ arranged radially therein and suitably insulated therefrom so that circulating currents through the pins and between the laminations will be prevented. In the present instance the laminations are supported so as to have substantially the same axis as the clamping member 3 by the winding supporting pins 5, which are passed through openings 7, and are insulated from the machine by means of suitable insulating bushings $7^a$.

It may be found convenient to bind the laminations of the annulus 6 together by some other means than the pins $6^a$, and I may employ a clamp 8 bolted to the member $3^b$ as shown in Fig. 4. Another simple way of holding the laminations of annulus 6 together is by the use of transverse welded joints as shown at 9 in Fig. 3. In this latter construction it is desirable to have the welded joints 9 placed against the clamping member 3 so that closed conducting paths on the face of the annulus, and the consequent circulation of large eddy currents therethrough, will be avoided.

The embodiment of the invention herein disclosed is to be taken merely as an example of one mode of applying the principle thereof, and it may be found desirable to modify the proportion of parts, for example, to extend the width of the annulus 6 so as to more completely shield the body of the machine from magnetic flux entering the sides thereof, or to form it by the use of a plurality of arcuate sections 6b, as shown in Fig. 5, thereby obtaining an increase in the reluctance of the magnetic path therethrough.

In the operation of the foregoing described structure a rotor, in which magnetic flux is produced, is supported with the face thereof closely adjacent the laminations 2, this produces a variation of the flux threading the coil of which the conductor 4 is a part and currents will be induced therein. Most of the flux produced in the rotor will enter the laminated body 2 but adjacent the end thereof there is a certain leakage of flux, rotating synchronously with the rotor, which will have a tendency to enter the sides of clamping member 3, but in my construction this flux will be diverted into the annulus 6, as it forms a magnetic path of low reluctance.

The induced alternating current flowing through the conductor 4 and its end connection 4a produces a varying flux surrounding the conductors which has a tendency to enter the sides of the clamping member 3 and this flux is also diverted into the path of low reluctance through annulus 6.

By the use of the laminated annulus 6 in this construction, the flux, which in former constructions enters the sides of the lamination clamping member, is diverted into a magnetic path formed of laminations insulated from each other, so that the cross section of the magnetic material through which the flux passes is small, and as will be readily understood, the eddy current losses therein will be much less than the loss would be if the flux were permitted to enter the sides of the clamping member.

It will be seen from the foregoing description that I have produced a construction wherein the eddy current losses of a dynamo-electric machine are very much lessened, and I desire it to be understood that my invention is not limited to the particular arrangement shown and described, but I intend in the appended claims to cover all modifications which do not depart from the spirit and scope of my invention.

What I claim as new and desire to secure by Letters Patent of the United States, is:—

1. In a dynamo-electric machine, the combination of laminations forming a path for magnetic flux, a clamping member for said laminations, electrical conductors of the machine positioned in slots in said laminations and extending transversely therebeyond, and laminated magnetic material adjacent said conductors having the edges of the laminations thereof facing away from said clamping member adjacent thereto for preventing magnetic flux entering the side thereof, whereby eddy current losses are reduced.

2. In a dynamo-electric machine, the combination of laminations forming a path for magnetic flux, a clamping member for said laminations, electrical conductors of the machine positioned in slots in said laminations and extending transversely therebeyond, and laminated magnetic material adjacent the extending portion of said conductors and said clamping member for preventing flux entering the side thereof, whereby eddy current losses are reduced.

3. In a dynamo-electric machine, the combination of laminations forming a path for magnetic flux, a clamping member for said laminations, electrical conductors of the machine positioned in slots in said laminations and extending transversely therebeyond, and laminated magnetic material adjacent the lateral faces of said clamping member, the edges of the laminations of which are presented outwardly relative to the lateral face of the clamping member.

4. In a dynamo-electric machine, the combination of laminations forming a path for magnetic flux, a clamping member for said laminations, electrical conductors of the machine, positioned in slots in said laminations and extending transversely therebeyond, laminated magnetic material adjacent the lateral face of said clamping member, the edges of the laminations of which are presented outwardly relative to the lateral face of the clamping member, and projections extending from said clamping member for supporting the laminated magnetic material.

5. In a dynamo-electric machine, the combination of laminations forming a path for magnetic flux, a clamping member therefor, electrical conductors of the machine positioned in slots in said laminations and extending transversely therebeyond, a shield of strips of magnetic material adjacent the lateral face of the clamping member, the edges of the strips of which are presented outwardly relative to the lateral face of the clamping member, said shield having openings therein, and means projecting from the clamping member extending through the openings in the magnetic material for supporting the same.

6. In a dynamo-electric machine, the combination of laminations forming a path for magnetic flux, a clamping member therefor, electrical conductors of the machine positioned in slots in said laminations and extending transversely beyond the laminations, and an annulus of strips of magnetic material adjacent the clamping member and having substantially the same axis as the clamping member, the edges of said strips being presented outwardly relative to the lateral face of the clamping member.

7. In a dynamo-electric machine, the combination of laminations forming a path for magnetic flux, a clamping member therefor, electrical conductors of the machine positioned in slots in said laminations and extending transversely beyond the laminations, an annulus of strips of magnetic material having substantially the same axis as the clamping member and being arranged adjacent the lateral face of the clamping member, means extending through the annulus and insulated therefrom for supporting the strips thereof together, and means for supporting said annulus adjacent the extending portion of said conductors and the clamping member.

In witness whereof, I have hereto set my hand this 28th day of January, 1927.

ROBERT POHL.